US008331358B2

(12) United States Patent
Chang et al.

(10) Patent No.: US 8,331,358 B2
(45) Date of Patent: Dec. 11, 2012

(54) SYSTEMS AND METHODS FOR CONNECTING A PACKET-BASED CALL TO A CONVENTIONAL TELEPHONE NETWORK

(75) Inventors: Dean Chang, Los Altos Hills, CA (US); Carlo Sarte, Mountain View, CA (US)

(73) Assignee: Actiontec Electronics, Inc., Sunnyvale, CA (US)

( * ) Notice: Subject to any disclaimer, the term of this patent is extended or adjusted under 35 U.S.C. 154(b) by 1482 days.

(21) Appl. No.: 11/880,964

(22) Filed: Jul. 25, 2007

(65) Prior Publication Data
US 2009/0028063 A1    Jan. 29, 2009

(51) Int. Cl.
*H04L 12/66* (2006.01)
*H04L 12/28* (2006.01)
*H04W 4/00* (2009.01)
*H04M 1/00* (2006.01)

(52) U.S. Cl. ........ 370/356; 370/401; 455/462; 455/551; 455/555

(58) Field of Classification Search .......... 370/352, 370/353, 354, 355, 356, 401, 466; 379/88.17, 379/90.01; 455/461, 462, 463, 465, 551, 455/552.1, 554.1, 555
See application file for complete search history.

(56) References Cited

U.S. PATENT DOCUMENTS

| 6,738,641 | B1 | 5/2004 | Elsasser |
| 6,748,057 | B2 | 6/2004 | Ranalli et al. |
| 6,751,297 | B2 | 6/2004 | Nelkenbaum |
| 6,763,102 | B1 | 7/2004 | Chen et al. |
| 6,826,194 | B1 | 11/2004 | Vered et al. |
| 6,853,719 | B2 | 2/2005 | McCormack et al. |
| 6,868,140 | B2 | 3/2005 | Myers et al. |
| 6,870,835 | B1 | 3/2005 | Chen et al. |
| 6,882,722 | B2 | 4/2005 | Gilbert et al. |
| 6,888,808 | B2 | 5/2005 | Jagadeesan et al. |
| 6,925,299 | B1 | 8/2005 | Sofer et al. |
| 6,928,156 | B2 | 8/2005 | Book |
| 6,931,111 | B1 | 8/2005 | Coffee |
| 6,982,985 | B1 | 1/2006 | Bohacek et al. |
| 6,985,478 | B2 | 1/2006 | Pogossiants et al. |
| 6,985,723 | B2 | 1/2006 | Kil |
| 6,993,360 | B2 | 1/2006 | Plahte et al. |
| 6,999,431 | B2 | 2/2006 | Rines |
| 7,002,995 | B2 | 2/2006 | Chow et al. |
| 7,006,490 | B2 | 2/2006 | Hagirahim |
| 7,006,614 | B2 | 2/2006 | Feinberg et al. |
| 7,016,338 | B2 | 3/2006 | Gunn et al. |
| 7,054,420 | B2 | 5/2006 | Barker et al. |

(Continued)

OTHER PUBLICATIONS

Goralski et al., 1999, "Telephony for IP People", IP Telephony; Chapters 3 and 9: 101-149 and 301-326.

(Continued)

*Primary Examiner* — Christopher M Brandt
(74) *Attorney, Agent, or Firm* — Jones Day; Nicola A. Pisano; Jaime D. Choi (57) ABSTRACT

Methods and systems are provided for allowing an packet-based call made to a first identifier to dial a phone number within a telephone network. The method comprises sending a data packet from the packet-based call to a gateway device that can communicate with the telephone network. The data packet comprises the first identifier. The gateway device finds the phone number corresponding to the first identifier using a lookup table accessible to the gateway device. The gateway device then dials the phone number and transfers the data packet to the phone number.

98 Claims, 6 Drawing Sheets

U.S. PATENT DOCUMENTS

| | | |
|---|---|---|
| 7,065,070 B1 | 6/2006 | Chang |
| 7,069,291 B2 | 6/2006 | Graves et al. |
| 7,069,368 B2 | 6/2006 | Thornton |
| 7,075,918 B1 | 7/2006 | Kung et al. |
| 7,088,810 B1 | 8/2006 | Burg |
| 7,092,386 B2 | 8/2006 | Wynn |
| 7,099,301 B1 * | 8/2006 | Sheu ............................ 370/352 |
| 7,113,500 B1 | 9/2006 | Bollinger et al. |
| 7,180,993 B2 | 2/2007 | Hamilton |
| 7,181,522 B2 | 2/2007 | Shah et al. |
| 7,212,521 B2 | 5/2007 | Kwon |
| 7,466,810 B1 * | 12/2008 | Quon et al. ............. 379/201.01 |
| 7,764,667 B1 * | 7/2010 | Stewart et al. ................ 370/352 |
| 7,991,001 B2 * | 8/2011 | Nix et al. ...................... 370/466 |
| 2002/0188755 A1 * | 12/2002 | Yeom ............................ 709/238 |
| 2004/0037272 A1 * | 2/2004 | Park .............................. 370/354 |
| 2004/0208192 A1 * | 10/2004 | Yoshihara et al. ............ 370/431 |
| 2005/0259636 A1 * | 11/2005 | Chun ............................ 370/352 |
| 2006/0013254 A1 * | 1/2006 | Shmueli et al. ............... 370/466 |
| 2006/0067303 A1 * | 3/2006 | Murakami et al. ............ 370/352 |
| 2006/0252453 A1 * | 11/2006 | Hung ......................... 455/552.1 |
| 2007/0064616 A1 * | 3/2007 | Miranda et al. .............. 370/250 |
| 2007/0143397 A1 * | 6/2007 | Guedalia et al. ............. 709/203 |
| 2007/0160034 A1 * | 7/2007 | Koretsky ...................... 370/352 |
| 2007/0167167 A1 * | 7/2007 | Jiang ............................ 455/453 |
| 2007/0179885 A1 * | 8/2007 | Bird et al. ....................... 705/39 |
| 2007/0189264 A1 * | 8/2007 | Liu ................................ 370/351 |
| 2007/0291733 A1 * | 12/2007 | Doran et al. .................. 370/352 |
| 2008/0019354 A1 * | 1/2008 | Wan .............................. 370/352 |
| 2008/0208605 A1 * | 8/2008 | Sinha et al. ...................... 705/1 |

OTHER PUBLICATIONS

Hersent et al., 2000, "The application layer, IP telephony protocols," IP Telephony Packet-based multimedia communications systems: 3-118.

* cited by examiner

| Skype ID 1 | Phone number 1 |
|---|---|
| Skype ID 2 | Phone number 2 |
| Skype ID 3 | Phone number 3 |
| ⋮ | ⋮ |
| Skype ID n | Phone number k |

SYSTEMS AND METHODS FOR CONNECTING A PACKET-BASED CALL TO A CONVENTIONAL TELEPHONE NETWORK

FIELD OF THE INVENTION

The present invention relates to systems and methods having a packet based call, such as a Skype call, made to a personal identifier (e.g., a Skype ID) dial a phone number within a landline or mobile telephone network.

BACKGROUND OF THE INVENTION

The Internet has become a transportation medium for large varieties of data. Text documents, HTML files, and multimedia files are a few examples. Real-time communication can also be achieved over the Internet. Some forms of real-time communication include instant messaging (e.g. MSN Instant Messenger, AOL Instant Messenger, etc.), Voice-over-Internet Protocol (VoIP), and video conferencing.

One enabler of real-time communication is Skype. The Skype Group, acquired by eBay in September 2005, provides a free peer-to-peer Internet telephony network. Users who download the Skype program and register themselves into the Skype network select a unique user identifier (ID). This user ID allows other people in the Skype network to find and identify the person who has the ID. People can communicate through the Skype network by calling another person using their Skype ID and then communicating either in voice or video using their computer. Skype calls are routed through the Internet, and thus any two people anywhere in the world can communicate over Skype if both of them are Skype users. All that is needed for a person to use the Skype system is a computer with Internet access and a broadband connection to allow for real-time communication, the Skype program installed on the computer, a microphone, a speaker or headset, and a webcam (only needed for video communication). Skype also offers a SkypeOut service, which allows Skype users to call any phone in the world by paying either a per-minute fee or a flat monthly or yearly fee. Skype also offers a SkypeIn service which allows public switched telephone network (PSTN) or mobile phone callers to dial a regular number to reach a Skype client. It is undesirable for an organization (e.g. a company) that wants to receive telephone calls from Skype users to rely on the SkypeOut service because the caller, not the receiver, would pay for the call. This may also be true with users of other public packet-based call services. It is desirable for organizations to be able to receive web-based calls such as Skype.

The main difference between Skype and VoIP clients is that Skype operates on a peer-to-peer model, rather than the more traditional server-client model. The Skype user directory is entirely decentralized and distributed among the nodes in the network, which means the network can scale very easily to large sizes, currently over 171 million users, without a complex and costly centralized infrastructure. Skype also routes calls through other Skype peers on the network to ease the traversal of symmetric network address translations (NATs) and firewalls. This, however, puts an extra burden on those who connect to the Internet without NAT, as their computers and network bandwidth may be used to route the calls of other users. The Skype code is closed source, and the protocol is not standardized.

Forms of conventional circuit switched telephone communication have also advanced. Many large organizations have many employees who need to make use of a telephone to communicate with other employees or external persons. However, it is very expensive for the organization to purchase a single telephone line for every employee. Also, not every employee uses the phone all the time. One method of solving this problem is to use a private branch exchange, otherwise known as PBX. A PBX allows many telephone users to connect to a limited number of telephone lines. Each telephone in the telephone network within the organization is connected to the PBX system, which in turn is connected to a small number of telephone lines (e.g. 4 lines). Employees within the PBX system can call each other easily, since the PBX simply connects one telephone in the system to another. Whenever an employee makes a phone call to someone not in the PBX system (e.g. external to the organization), the call goes to the PBX, which in turn connects the call to one of the telephone lines. When another employee makes a phone call, the PBX routes the call to a telephone line that is not being used. If an employee calls out and all the telephone lines are in use, the PBX does not complete the call. In a similar manner, the PBX can also accept incoming calls through the telephone lines. The PBX will route the call to the appropriate person, for example using an extension.

Advances in the art have made it possible for a PBX system to work with VoIP instead of a conventional circuit switch system. This type of PBX system, sometimes called an IP PBX or IPBX, is digital instead of analog. Voice data is transmitted digitally from a person's phone and routed to the PBX system. The PBX converts the digital voice data back into analog form for transmission over the conventional public telephone network. Likewise, incoming analog calls are converted into digital voice data by the PBX and forwarded to a user in the PBX system. In addition, the development of mobile phones has allowed people to send and receive calls while not tied to a specific location, and call forwarding allows calls to a number within the PBX system to be forwarded to mobile phones. However, PBX and IP PBX systems lack the ability to integrate with public packet-based call services such as Skype. PBX and IP PBX cannot have one or more user IDs, such as a Skype ID, associated with them, and cannot handle an incoming packet-based call that is made to a user ID instead of a telephone number within the system.

One method of handling computer network traffic is to use a process called network address translation (NAT). Individual devices within a computer network all have an unique private IP address. However, the router that connects the devices to a larger network (e.g. the Internet) only has one public IP address that is visible from the outside. Communications, such as outgoing VoIP calls, that originate from within the computer network go to the router. The router replaces the private IP address from the call with the public address of the router, and forwards the call to the destination. When a reply comes from the destination, the router will determine which private IP address the reply should be sent to using information collected from the outgoing call. NATs can operate using more than one public IP address, but additional public IP addresses may cost money to obtain. Also, calls originating from outside the computer network cannot reach their destination because the router does not know which private IP address the call should be routed. Only calls that originate within the computer network can be completed.

Organizations may want to receive telephone calls from users of public packet-based call services such as Skype but do not want the users to bear the cost of phoning in (e.g. by using SkypeOut). It is desirable for a public packet-based call made to an organization to be transferred to a normal telephone number at the organization's site. What is needed in the art are methods and systems for receiving a public packet-based call and transferring the call to a telephone number within a telephone network.

Discussion or citation of a reference herein will not be construed as an admission that such reference is prior art to the present application.

SUMMARY OF INVENTION

In an aspect of the present invention, a method is provided for having a packet-based call (e.g., a Skype call) made to a personal identifier (e.g., a first Skype identifier) dial a phone number within a telephone network. The method comprises forwarding the packet-based call to a first proxy identifier (e.g., a second Skype ID) with a plurality of proxy identifiers that are visible to an Internet network. The plurality of proxy identifiers are associated with a gateway device that can communicate with the telephone network. The gateway device analyzes a data packet sent from the packet-based call, where the data packet comprises a digital payload and a header. The header contains the personal identifier, and the payload contains digital voice data. The gateway device finds the phone number corresponding to the personal identifier using a lookup table accessible to the gateway device. The gateway device then dials the phone number and transfers the data packet to the phone number.

In some embodiments, the phone number is a complete public switch telephone network (PSTN) phone number, which may include an extension. In other embodiments, the phone number is a public branch exchange (PBX) extension. In some embodiments the gateway device receives the data packet from a computer connected to the gateway device, where the computer is capable of receiving data packets from the Internet. In some embodiments, the gateway device has a digital-to-analog (DAC) converter which can convert the digital voice data to analog voice data. In some embodiments the gateway device is a VoSKY Exchange device.

The lookup table comprises a mapping of a plurality of personal identifiers (e.g., a plurality of Skype IDs) to a plurality of phone numbers. The gateway device locates the personal identifier in the plurality of personal identifiers and obtains the corresponding phone number through the mapping. In some embodiments, the mapping of identifiers to phone numbers is one-to-one, but in other embodiments a phone number may have more than one personal identifier. If the personal identifier cannot be found in the plurality of personal identifiers, no phone number can be obtained and the gateway device either terminates the packet-based call or routes the call to a messaging system. In some embodiments, the lookup table is stored in the gateway device.

In some embodiments, the telephone system is a PBX system. In these embodiments, the gateway device communicates with the PBX system through, for example, a phone port. The gateway device sends analog voice data to the PBX system. Analog voice data is obtained from the digital voice data through a digital-to-analog converter. In other embodiments, the telephone system is an IP PBX system. In these embodiments, the gateway device can send the digital voice data directly to the IP PBX system.

In some embodiments, the telephone network is a PSTN system. The gateway device can dial the PSTN system using several methods. In one method, the gateway device makes a SkypeOut call to the phone number. In another method, the gateway device sends information over a foreign exchange office (FXO) port to a foreign exchange subscriber (FXS) port of the PSTN system. In yet another method, the gateway device sends information over a T1/E1 or an Ethernet LAN connection to a telephone service provider. In some embodiments, the gateway devices use a session initiation protocol (SIP) to communicate through an Ethernet connection.

In some embodiments the telephone network is a mobile telephone system. The gateway device can dial the PSTN system using several methods. In one method, the gateway device makes a SkypeOut call to the phone number. In another method, the gateway device has a wireless communications module that is capable of sending digital voice data to the mobile telephone system. In some embodiments, the wireless communications module is a CDMA or GSM module. In another method of communicating with the mobile telephone system, the gateway device can send information over a T1/E1 bus or an Ethernet LAN connection to a mobile telephone service provider. In some embodiments, the gateway devices use a SIP protocol to communicate through an Ethernet connection. In some embodiments, the packet-based call is sent through a peer-to-peer Internet network. In some embodiments, the packet-based call is generated by a computer or a SkypeIn call.

In some embodiments, the gateway device can receive more than one packet-based call simultaneously. The gateway device has multiple proxy identifiers associated with it and multiple input and output ports capable of handling multiple calls. When a second packet-based call is made to a phone number within the telephone network, it is forwarded to a second proxy identifier that is associated with the gateway device. The gateway device then looks up the phone number that the second packet-based call is dialing and forwards the call to that number.

In an aspect of the present invention a system is provided that allows a peer-to-peer packet-based Internet call (e.g. a Skype call) made to a personal identifier (e.g., a first Skype ID) to dial a phone number within a telephone network. The system comprises a telephone network and a gateway device. The gateway device comprises a lookup table that maps the personal identifier to the phone number, a proxy identifier (e.g., a second Skype ID) within a plurality of proxy identifiers that are visible to an Internet network. The personal identifier is set to forward calls to the proxy identifier. The gateway device also comprises a plurality of input ports having a first input port capable of accessing the Internet, and a plurality of output ports having a first output port capable of communication with the telephone network.

In some embodiments, the gateway device is a VoSKY Exchange device. In some embodiments, the first input port or output port is a USB port, wireless communications module, or a data cable. In some embodiments, the first input port is connected to an electronic device, such as a computer, capable of receiving the data packet from the Internet. In some embodiments, the first output port is capable of communicating with the Internet, an FXS port, a PSTN system, a PBX or IP PBX system, or a mobile telephone system. In some embodiments, the gateway device further comprises a digital-to-analog converter. In some embodiments, the telephone system is a PBX system or an IP PBX system, a PSTN system, or a mobile telephone system.

BRIEF DESCRIPTION OF THE DRAWINGS

Like reference numerals refer to corresponding parts throughout the several views of the drawings.

DETAILED DESCRIPTION

Disclosed in the present invention are methods and systems for connecting a public packet-based call, such as a Skype call, to a telephone number within a telephone network. Telephone networks contemplated in the present invention include PBX systems, IP PBX systems, public switched telephone networks (PSTN), mobile phone systems, and other such systems. This allows users within the telephone network to receive calls from Skype users anywhere in the world without using a computer.

In accordance with some embodiments of the present invention, a remote Skype caller makes a Skype call to a first device assigned a first Skype ID. The first Skype ID forwards the call to a second device assigned to a second Skype ID, where the second device is a gateway device. The gateway device receives a data packet, the data packet forming part of the Skype call. The gateway device extracts the first Skype ID from the header of the data packet and searches a look-up table for the first Skype ID. If the first Skype ID is found within the look-up table, the gateway dials the phone number associated with the ID. This phone number is within a telephone network and the gateway device is able to communicate with the network. Hereinafter, the terms communicate, connect, transfer, and other like words are defined as the ability to transmit or receive information from one device to another or from one location to another. The term public packet-based call service refers to any service that is available to the general public which provides a way of making a telephone call over a packet-based communications system such as the Internet. The term personal identifier refers to any identifier, username, or login name associated with a personal profile on a user network. For example, a Skype ID is a personal identifier within the Skype user network if the profile associated with the Skype ID belongs to a specific person. The term proxy identifier refers to any identifier, username, or login name on a user network but not belonging to a specific person. For example, a Skype ID belonging to a device that is for general use in a company or another organization can be a proxy identifier. The terms personal identifier and proxy identifier as used in the present invention do not refer to numerical telephone numbers.

Figure 1:
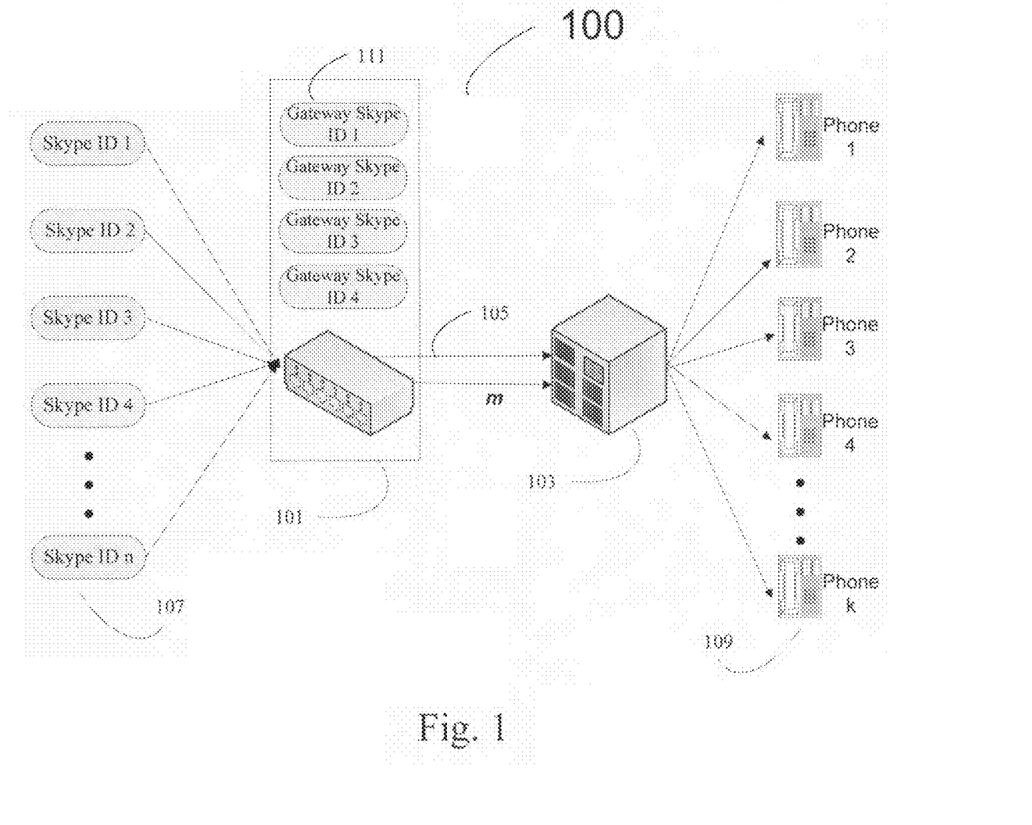
FIG. 1 illustrates a communications system in accordance with an embodiment of the present invention.
Figure 5:
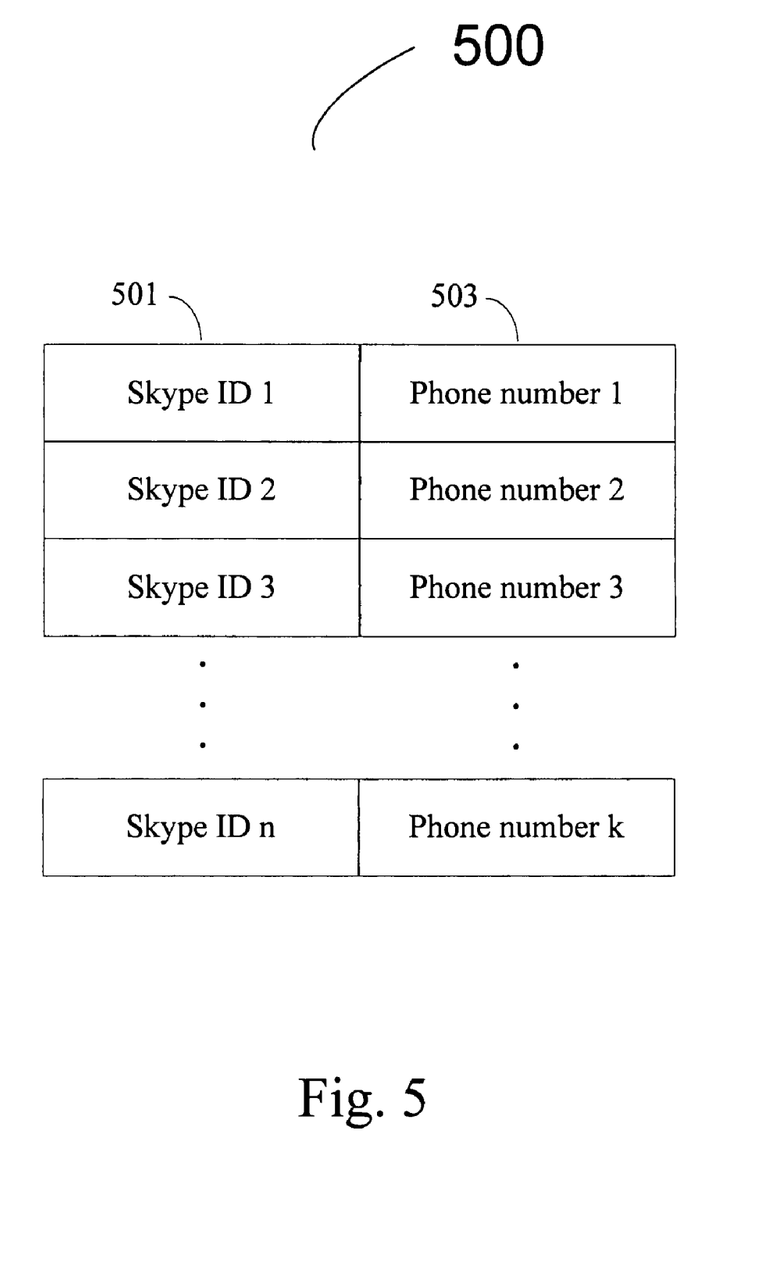
FIG. 5 illustrates a look-up table in accordance with an embodiment of the present invention.

FIG. 1 shows a system 100 in accordance with an embodiment of the present invention. FIG. 1 illustrates n personal Skype IDs 107 and k telephone numbers 109, where n and k are positive integers. Skype IDs are associated with an IP address so that a call to a specific Skype ID will be directed to the computer or electronic device with the IP address associated with the Skype ID. In an aspect of the present invention, each personal Skype ID corresponds to a telephone number within the k telephone numbers 109. In some embodiments, there is a one-to-one mapping of personal Skype IDs and telephone numbers (n=k). That is, every end user within the telephone network has a unique Skype ID. For example, Skype ID 1 could correspond to telephone number 1, Skype ID 2 could correspond to telephone number 2, and so forth, as shown in FIG. 5. In other embodiments, a telephone number may map to more than one Skype ID (n>k).

Referring back to FIG. 1, device 101 can also possess a plurality of proxy Skype IDs 111 associated with it. The personal Skype IDs 107 are set to forward calls to one of the proxy Skype IDs 111. For example, Skype ID 1 in FIG. 1 can be set to forward to gateway Skype ID 2. Therefore, whenever an external Skype user calls one of the Skype IDs 107, the call is forwarded to one of the proxy Skype IDs 111, thereby directing the call to device 101. FIG. 1 shows four proxy Skype IDs, but the number of Skype IDs associated with device 101 can be more or less than four. Call forwarding from one Skype ID to another Skype ID is a feature of the Skype program.

Figure 6:
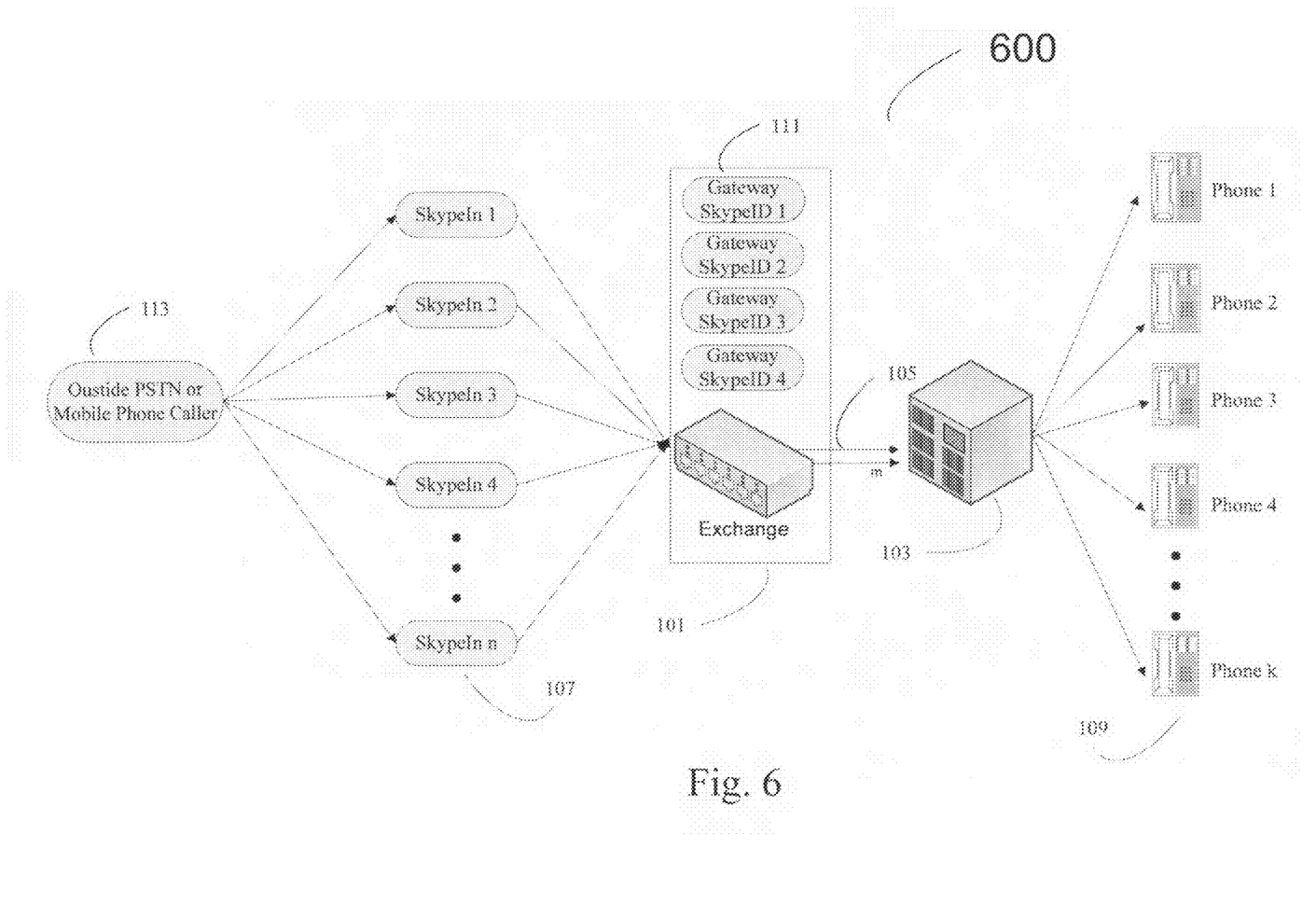
FIG. 6 illustrates a SkypeIn system in accordance with an embodiment of the present invention.

Device 101 comprises a plurality of input and output ports which enables device 101 to communicate with other electronic equipment. Some embodiments of input and output ports are USB ports, phone ports, wireless communication modules, or data cables (e.g. a T1 line). Device 101 can send and receive data from other devices such as a computer or a telephone network. In an aspect of the present invention, device 101 receives data packets from the Internet and sends data packets to a telephone network. The data packets could be part of an incoming Skype call, such as from a normal Skype client or from a SkypeIn call. A SkypeIn call is made from a PSTN or mobile telephone but is transmitted over the Skype network. Device 101 can receive a SkypeIn call 113 and deliver it to on of the telephone numbers 109 as shown in FIG. 6.

A data packet comprises a payload and a header. The payload of a data packet contains the data to be passed between two electronic devices, and in a Skype call the payload can comprise digital voice data. The header contains identifying information such as the protocol of the packet and the address of the sender and receiver of the packet. In a Skype call, the header of a data packet can comprise the Skype ID (or the IP address of the Skype ID) of the intended receiver. Device 101 can extract the personal Skype ID from a received data packet and determine the corresponding telephone number from the plurality of telephone numbers 109. One method for device 101 to achieve this is to use a look-up table stored in device 101. The input to the look-up table is the personal Skype ID and the output of the table is the corresponding telephone number. In some embodiments, the look-up table comprises a set of Skype IDs, a set of telephone numbers, and a mapping between each Skype ID and telephone number. An example of a look-up table is shown in FIG. 5. Column 501 of the look-up table contains personal Skype IDs 1 through n while column 503 contains telephone numbers 1 through k. An embodiment of a mapping is illustrated in FIG. 5 where the personal Skype ID is mapped to the telephone number in the same row as the personal Skype ID in the look-up table (e.g. Skype ID 1 maps to telephone number 1). In some embodiments, telephone numbers in column 503 can be full telephone numbers (e.g. an area code plus a 7 digit number for local area calls within the United States, or more digits for domestic long distance calls or International telephone calls) while, in other embodiments, the telephone numbers can be abbreviated phone numbers such as a telephone extension (e.g. a 4 digit extension).

Device 101 then communicates with device 103 over communications channels 105 and dials the telephone number associated with the personal Skype ID. In an aspect of the present invention, device 103 is a hub within a telephone system. Thus device 103 can dial telephone numbers within the telephone network. There are m communications channels 105, where m is a positive integer less than n. In some embodiments, device 101 converts the data type of the payload before sending it to device 103. For example, the data packet may contain digital voice data and device 101 converts the digital voice data to analog voice data before passing the data to device 103. A digital-to-analog converter (DAC) can be used to accomplish the conversion. Device 103 is connected to the telephone corresponding to the telephone number and sends the voice data to the telephone. Thus, the incoming Skype call is routed to the appropriate telephone number. In some embodiments, device 101 sends the voice data to device 103 using an application-layer control protocol such as a session initiation protocol (SIP). The SIP can support phone numbers.

An embodiment of device 101 is the VoSKY Exchange, which serves as a VoIP gateway. In some embodiments, device 101 is any device that is capable of receiving calls over the Internet, processing the incoming data, and routing them to various telephone networks. In some embodiments, the gateway device 101 has a plurality of input and output ports, such as USB ports and phone ports. In some embodiments, gateway device 101 is capable of supporting different Skype functions such as Skype Call, SkypeIn, SkypeOut, SkypeWeb, and Skype account management and billing. In some embodiments, gateway device 101 is capable of supporting telephony features such as call transfer, call pickup, call hold, call waiting, and call conferencing.

In some embodiments, communication channels 105 can comprise a telephone line, an Internet connection, a T1/E1 data bus, a foreign exchange office interface (FXO) port, an Ethernet connection, or a wireless communications module such as a CDMA or GSM chip. In some embodiments, device 103 comprises a PBX system, an IP PBX system, a PSTN system, or a mobile cellular provider network.

Figure 2:
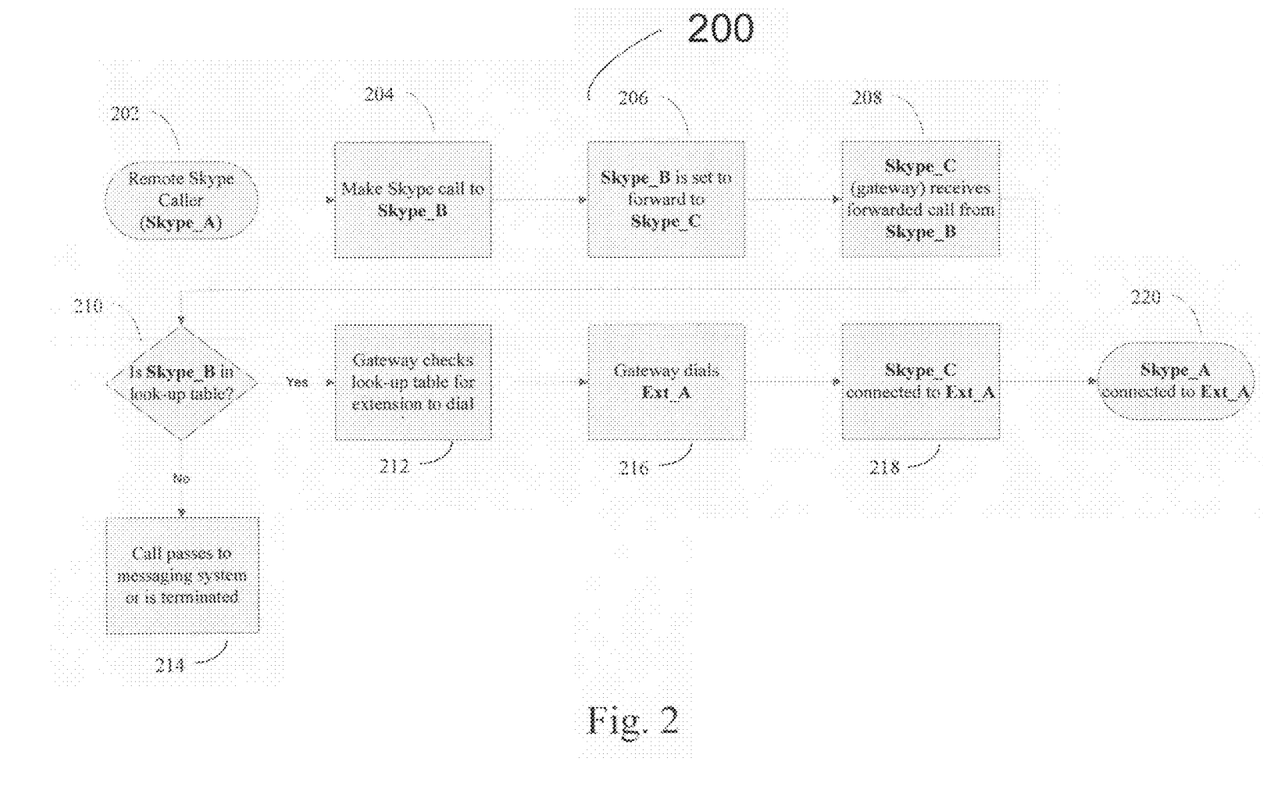
FIG. 2 illustrates a method of delivering a Skype call to a PBX network in accordance with an embodiment of the present invention.

FIG. 2 shows a method of having a Skype call made to a Skype ID dial a phone number within a PBX system. The method of FIG. 2 can be operated on the system as illustrated in FIG. 1 when device 103 is a PBX system, but the method is not limited to the elements described in FIG. 1. A remote Skype caller 202 has a Skype ID labeled as Skype_A in FIG. 2. In step 204, Skype caller 202 makes a Skype call to a personal Skype user ID labeled Skype_B, which corresponds to a telephone number labeled Ext_A within a telephone network. The Skype_B user ID has been set to forward calls to a proxy Skype user ID labeled Skype_C, which belongs to a gateway device such as device 101 in FIG. 1. Since calls to Skype_B are forwarded to Skype_C, the remote Skype user's call is directed to the IP address associated with the Skype_C ID. Both Skype_B and Skype_C are logged on to the Skype network. The IP address for Skype_C belongs to the gateway device 101, and therefore in step 208 the gateway device receives the forwarded call from Skype_B. In some embodiments, there is an intermediate device between the Internet connection and the gateway device, such as a computer. The computer receives the Skype call and passes the data packets along to the gateway device. The forwarded call comprises a plurality of data packets, each packet containing a payload and a header. The gateway device extracts the header from the data packet, specifically the Skype ID of the intended recipient of the call (in this case, Skype_B). Methods of extraction of data from a data packet are known in the art.

In step 210, the gateway device checks whether Skype_B corresponds to a telephone number within the PBX network that is connected to the gateway device. The gateway utilizes a look-up table, for example a direct inward dialing (DID) list, to accomplish this checking. An example of a look-up table is provided in FIG. 5. The look-up table may be stored, for example, in the electronic memory of the gateway device. For example a read-only memory (ROM) or random-access memory (RAM) component of the gateway device can store the look-up table. Methods of constructing and storing look-up tables in electronic memory are known in the art. The gateway device searches the look-up table for a Skype ID entry that matches Skype_B. If it finds such an entry, the gateway device obtains the corresponding telephone number Ext_A that maps to Skype_B in step 212. If Skype_B cannot be found within the look-up table, the gateway device goes to step 214, where it either terminates the call or passes the call to an automated messaging system or an interactive voice response (IVR) system.

In step 216, the gateway device dials telephone number Ext_A that it obtained from the look-up table. The gateway device and the PBX system are connected to each other through a communications channel such as channels 105 in FIG. 1. For example, four telephone lines can connect the output ports of gateway device to the PBX system. The PBX system hosts a plurality of telephone numbers including Ext_A. If there is at least one communications channel which is not in use, then the gateway device and Ext_A become connected in step 218. If all communications channels are busy, the gateway device can send a busy signal tone to the remote Skype caller. In some embodiments, the PBX system is only capable of supporting analog voice data. In such embodiments, the gateway device 101 has a DAC that can convert the digital payload received from the data packets into analog voice data to pass on to the PBX system. In other embodiments, the PBX system is capable of supporting digital voice data (e.g. IP PBX). In this case, the gateway device does not need to use a DAC to convert the digital payload to another form and simply passes along the payload or the entire data packet. Thus Ext_A is connected with Skype_C of the gateway device.

In step 220, the gateway device starts passing the payload sent by remote Skype caller 202 to the telephone at Ext_A, completing initiation of the call. Thereafter, Ext_A and Skype caller 202 communicate to each other through the connection established above. Voice data that originates from caller 202 is routed back through an analog-to-digital converter (ADC) of the gateway device 101 (if the voice data is in analog form). The digital voice data is sent as a data packet payload, along with a header that includes the Skype_A ID, over the Internet to remote Skype caller 202. While the remote Skype caller and the user at number Ext_A are in communication, data packets are sent by the remote Skype caller over the Internet to the Skype user ID Skype_B. These data packets are forwarded to Skype_C, which corresponds to the gateway device. Each data packet is analyzed by the gateway device to determine if the intended receiver of the call is within the PBX system. If it is, the gateway device converts the digital payload to analog form (only if the PBX system cannot support digital voice data) and passes it to the PBX system, which in turn passes it to Ext_A. When either the remote Skype caller or the receiver in the PBX system ends the call, then no more data is transferred between them through the system.

Figure 3:
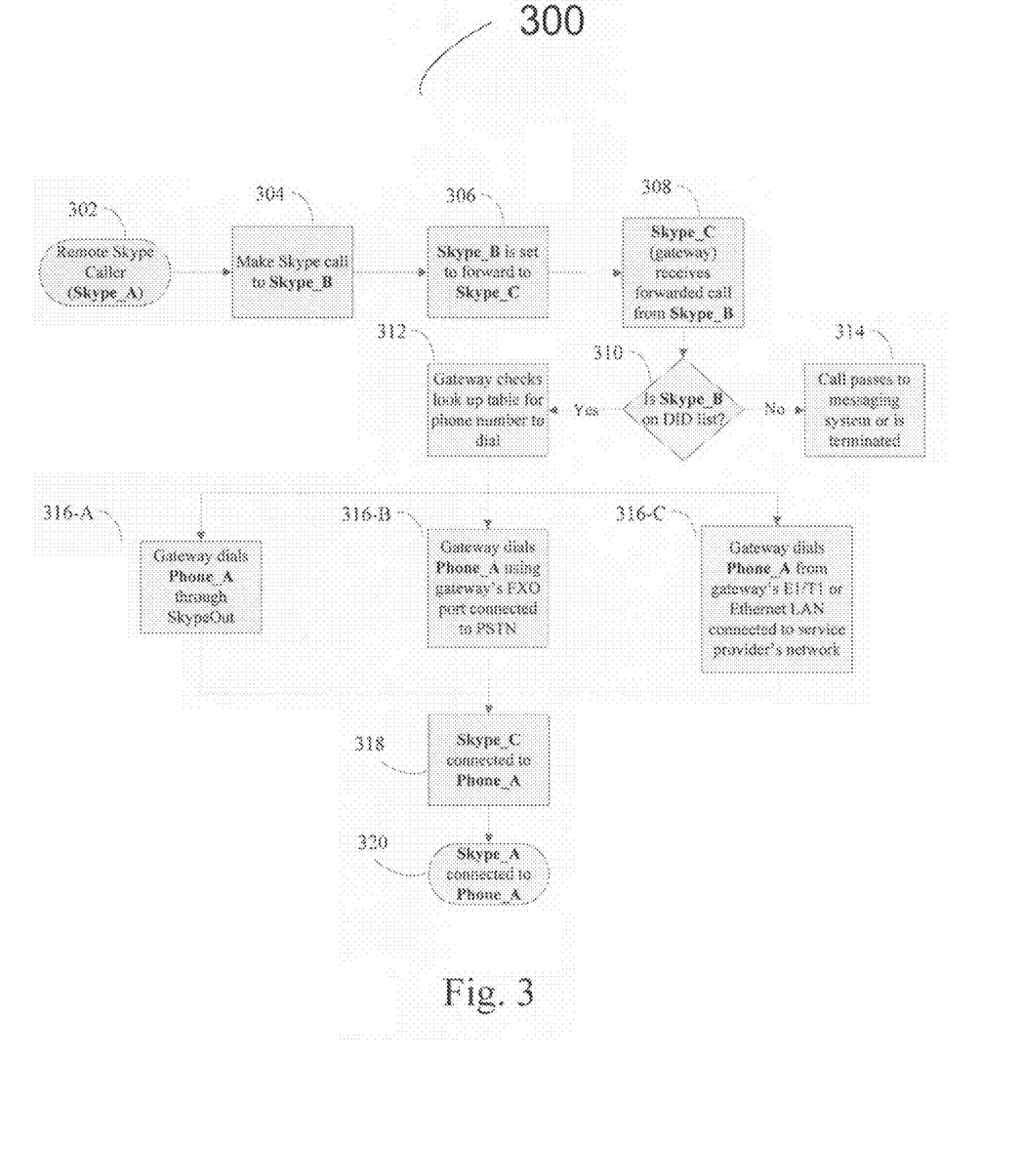
FIG. 3 illustrates a method of delivering a Skype call to a PSTN in accordance with an embodiment of the present invention.

FIG. 3 shows a method of having a Skype call made to a Skype ID dial a phone number within a public-switched telephone network (PSTN) system as opposed to the PBX system used in the method of FIG. 2. The method of FIG. 3 can be operated on the system as illustrated in FIG. 1 where device 103 is now a PSTN system (rather than a PBX system as it was in the method of FIG. 2), but is not limited to the elements described in FIG. 1. The method for transferring a Skype call into a PSTN system is similar to the method for transferring the call into a PBX system except for the methods the gateway device uses to connect to the telephone network (steps 316-A through 316-C in FIG. 3, step 216 in FIG. 2). Remote Skype caller 302, with a Skype ID labeled Skype_A, places a Skype call to a personal Skype user ID labeled Skype_B in step 304. Skype_B has been assigned to a telephone number within a PSTN system. The PSTN system is connected to a gateway device such as device 101 in FIG. 1. The gateway device has a plurality of proxy Skype IDs, one of which is labeled Skype_C. Skype_B is set to forward calls to Skype_C, and therefore the gateway device receives the call from the remote Skype caller in step 308, where the call comprises a series of digital data packets each comprising a payload and header. The gateway device extracts the Skype_B ID located within the header of each of the data packets.

In step 310, the gateway device checks to see if Skype_B maps to a telephone number within the PSTN by using a look-up table, such as a DID list. If Skype_B does map to a telephone number within the PSTN, then in step 312 the gateway device extracts that number, labeled Phone_A, from the look-up table. If Skype_B does not map to any number in the look-up table, then in step 314 the gateway device terminates the call or transfers the call to a messaging system.

In step 316, the gateway device dials out to a PSTN system using a communications channel between the gateway device and the PSTN system. If all of the communications channels are at capacity, then the gateway device can send a busy signal to the remote Skype caller. FIG. 3 illustrates three methods of accomplishing step 316, but the present invention is not limited to the illustrated methods. Other methods of accomplishing step 316 that are known in the art are contemplated in the present invention. In some embodiments, the gateway device can use the SkypeOut service to dial Phone_A, as shown in 316-A. SkypeOut is a paid Internet service provided by Skype that allows Skype users to phone any telephone number, and therefore the Skype user is not restricted to calling only registered Skype users located at a computer. In step 316-A, the gateway device is connected to the Internet, and thus the gateway device can connect to the SkypeOut service to dial telephone number Phone_A.

In other embodiments, the gateway device can also directly connect to the PSTN through the gateway's device foreign exchange office (FXO) port, as shown in step 316-B. An FXO port can act as an interface between a digital communications system and a conventional analog telephone system. In some embodiments, when the gateway uses an FXO port, the PSTN device has a foreign exchange subscriber (FXS) port to communicate with the FXO. In yet other embodiments, the gateway device can communicate directly to the telephone service provider and can dial Phone_A by using the infrastructure of the telephone service provider. In one embodiment, the gateway device is connected to the service provider's network by, for example, a T1/E1 data bus or an Ethernet LAN connection, as shown in step 316-C. In yet other embodiments, the gateway device is connected to the telephone service provider's network through a LAN Ethernet connection.

In step 320, the gateway device starts passing the payload sent by remote Skype caller 202 to the telephone at Phone_B, completing initiation of the call. Thereafter, Phone_A and Skype caller 302 communicate to each other through the connection established above. Voice data that originates from caller 302 is routed back through an analog-to-digital converter (ADC) of the gateway device 101 (if the voice data is in analog form). The digital voice data is sent as a data packet payload, along with a header that includes the Skype_A ID, over the Internet to remote Skype caller 302.

Figure 4:
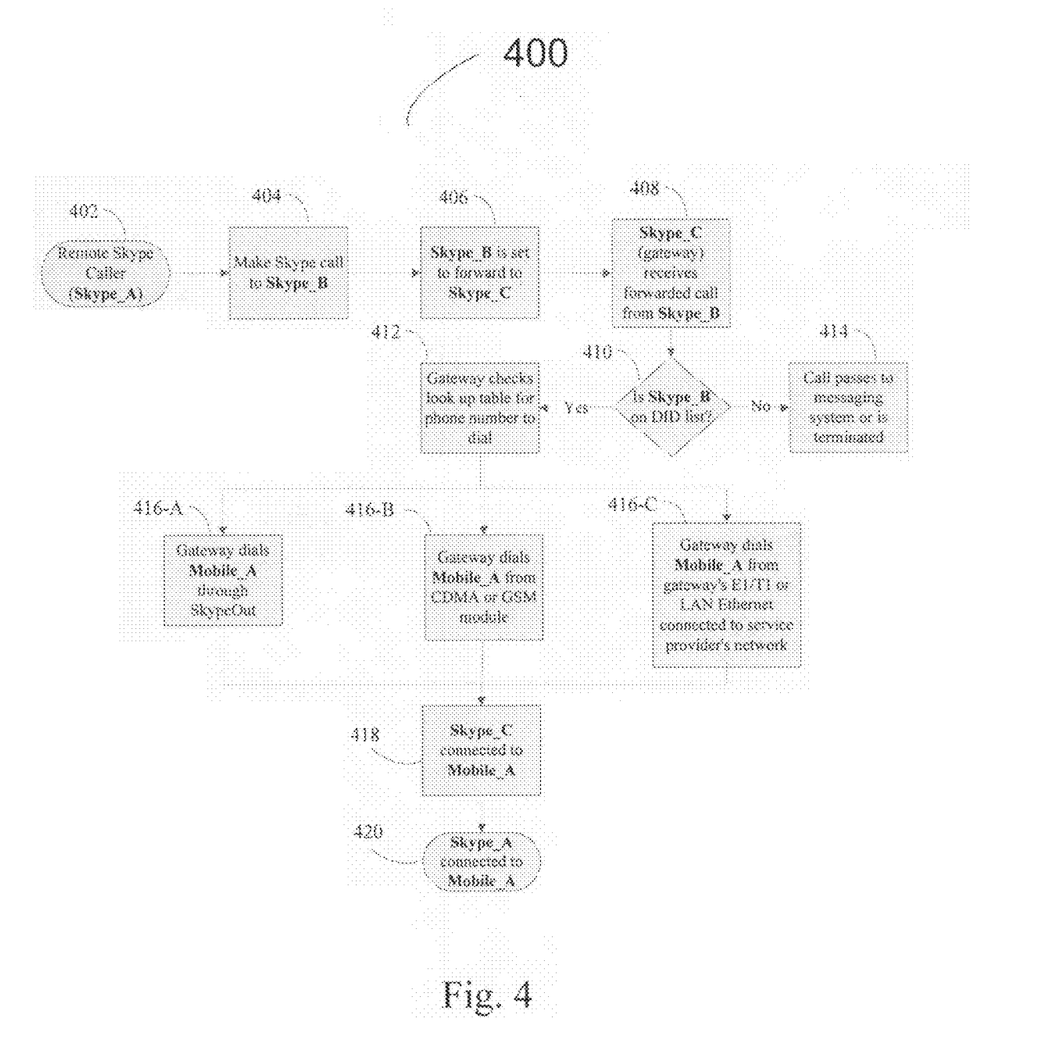
FIG. 4 illustrates a method of delivering a Skype call to a mobile telephone network in accordance with an embodiment of the present invention.

FIG. 4 shows a method of having a Skype call made to a Skype ID dial a phone number within a mobile telephone system. The method of FIG. 4 can be operated on the system as illustrated in FIG. 1 with device 103 representing the mobile telephone network, but is not limited to the elements described in FIG. 1. The method for transferring a Skype call to a mobile telephone is similar to the method for transferring the call into a PBX or PSTN system except for the methods the gateway device uses to connect to the mobile telephone (steps 416-A through 416-C in FIG. 4, steps 316-A through 316-C in FIG. 3, step 216 in FIG. 2). Remote Skype caller 402, with a Skype ID labeled Skype_A, places a Skype call to a personal Skype user ID labeled Skype_B in step 404. Skype_B has been assigned to a telephone number labeled Mobile_A within the mobile telephone network. The mobile telephone network is connected to a gateway device, such as device 101 in FIG. 1, either wirelessly or with wired connections. In some embodiments, the gateway device can include a wireless communications module, such as a CDMA or GSM module, to wirelessly communicate with a mobile telephone network. In other embodiments, the gateway device uses a physical connection such as a T1/E1 bus or an Ethernet connection to communicate with the mobile telephone network. The gateway device has a plurality of proxy Skype IDs, one of which is labeled Skype_C. Skype_B is set to forward calls to Skype_C, and therefore the gateway device receives the call from the remote Skype caller in step 408, where the call comprises a series of digital data packets each comprising a payload and header. The gateway device extracts the Skype_B ID from the header of the data packet.

In step 410, the gateway device checks if Skype_B maps to a telephone number within the mobile telephone network by using a look-up table, such as a DID list. If Skype_B does map to a telephone number within the mobile telephone network, then in step 412 the gateway device extracts the number Mobile_A from the look-up table. If Skype_B does not map to any number in the look-up table, then in step 414 the gateway device terminates the call or transfers the call to a messaging system.

In step 416, the gateway device dials out to a mobile telephone number within the mobile telephone network using a communications channel between the gateway device and the mobile telephone network. If all of the communications channels are at capacity, then the gateway device can send a busy signal to the remote Skype caller. FIG. 4 illustrates five methods of accomplishing step 416, but the present invention is not limited to the illustrated methods. Other methods of accomplishing step 416 that are known in the art are contemplated in the present invention. In some embodiments, the gateway device can use the SkypeOut service to dial Mobile_A, as shown in 416-A. The gateway device is connected to the Internet (e.g. via a computer), and thus it can connect to the SkypeOut service to dial the mobile telephone number Mobile_A.

In other embodiments, the gateway device can communicate directly to the mobile service provider and can dial Phone_A by using the infrastructure of the mobile service provider. In one embodiment, the gateway device can communicate with the wireless network through a CDMA or GSM module, as shown in step 416-B. In another embodiment, the gateway device is connected to the mobile service provider's network by, for example, a T1/E1 data bus or an Ethernet LAN connection, as shown in step 416-C. In steps 418 and 420, the gateway device completes the call to connect the remote Skype caller with the mobile telephone number corresponding to Skype ID Skype_B. The gateway device passes along the data packets received from the remote Skype caller to Mobile_A using the methods described in steps 416-A or 416-B.

In step 420, the gateway device starts passing the payload sent by remote Skype caller 402 to the telephone at Mobile_A, completing initiation of the call. Thereafter, Ext_A and Skype caller 402 communicate to each other through the connection established above. Voice data that originates from caller 402 is routed back to the gateway device 101. The digital voice data is sent as a data packet payload, along with a header which includes the Skype_A ID, over the Internet to remote Skype caller 402.

The present invention can be implemented as a computer program product that comprises a computer program mechanism embedded in a computer-readable storage medium. Further, any of the methods of the present invention can be implemented in one or more computers. Further still, any of the methods of the present invention can be implemented in one or more computer program products. Some embodiments of the present invention provide a computer program product that encodes any or all of the methods disclosed herein. Such methods can be stored on a CD-ROM, DVD, magnetic disk storage product, or any other computer-readable data or program storage product. Such methods can also be embedded in permanent storage, such as ROM, one or more programmable chips, or one or more application specific integrated circuits (ASICs). Such permanent storage can be localized in a server, 802.11 access point, 802.11 wireless bridge/station, repeater, router, mobile phone, or other electronic devices. Such methods encoded in the computer program product can also be distributed electronically, via the Internet or otherwise, by transmission of a computer data signal (in which the software modules are embedded) either digitally or on a carrier wave.

Some embodiments of the present invention provide a computer program product that contains any or all of the program modules shown in the figures. These program modules can be stored on a CD-ROM, DVD, magnetic disk storage product, or any other computer-readable data or program storage product. The program modules can also be embedded in permanent storage, such as ROM, one or more programmable chips, or one or more application specific integrated circuits (ASICs). Such permanent storage can be localized in a server, 802.11 access point, 802.11 wireless bridge/station, repeater, router, mobile phone, or other electronic devices. The software modules in the computer program product can also be distributed electronically, via the Internet or otherwise, by transmission of a computer data signal (in which the software modules are embedded) either digitally or on a carrier wave.

Many modifications and variations of this application can be made without departing from its spirit and scope, as will be apparent to those skilled in the art. The specific embodiments described herein are offered by way of example only, and the application is to be limited only by the terms of the appended claims, along with the full scope of equivalents to which such claims are entitled.

What is claimed:

1. A method for dialing a first phone number within a telephone network based on a first packet-based call made to a personal identifier, the method comprising:

receiving the first packet-based call made to the personal identifier, the first packet-based call including at least one data packet having a digital payload and a header that includes the personal identifier;

forwarding the received first packet-based call from the personal identifier and through an Internet network to a first proxy identifier within a plurality of proxy identifiers that are visible to the Internet network, wherein the plurality of proxy identifiers are associated with and direct packet-based calls to a gateway device that can communicate with the telephone network;

analyzing, at the gateway device, the at least one data packet of the forwarded first packet-based call to obtain the personal identifier based on the header;

finding the first phone number corresponding to the obtained personal identifier using a lookup table accessible to the gateway device;

dialing the first phone number using the gateway device; and transferring the data packet to the first phone number.

2. The method of claim 1, wherein the first phone number is a complete public switch telephone network (PSTN) phone number.

3. The method of claim 2, wherein the complete phone number comprises a main phone number and a telephone extension.

4. The method of claim 1, wherein the first phone number is a PBX telephone extension.

5. The method of claim 1, wherein the digital payload comprises voice data.

6. The method of claim 1, wherein the gateway device receives the data packet from a computer connected to the gateway device, wherein the computer is capable of receiving data packets from the Internet.

7. The method of claim 1, wherein the lookup table comprises a mapping of a plurality of personal identifiers to a plurality of phone numbers.

8. The method of claim 7, wherein the finding step comprises locating the personal identifier in the plurality of personal identifiers and obtaining the corresponding first phone number through the mapping.

9. The method of claim 7, wherein the mapping comprises a one-to-one correspondence of each personal identifier in the plurality of personal identifiers to each phone number in the plurality of phone numbers.

10. The method of claim 1, wherein the telephone network is a PBX system.

11. The method of claim 1, wherein the telephone network is an IP PBX system.

12. The method of claim 1, wherein the telephone network is a PSTN system.

13. The method of claim 12, wherein the dialing step comprises making a SkypeOut call to the first phone number.

14. The method of claim 12, wherein the gateway device further comprises an FXO port and the dialing step comprises sending information from the FXO port to a FXS port of the PSTN system.

15. The method of claim 12, wherein the dialing step comprises sending information over a T1/E1 bus or an Ethernet LAN connection to a telephone service provider.

16. The method of claim 1, wherein the telephone network is a mobile telephone system.

17. The method of claim 16, wherein the dialing step comprises making a SkypeOut call to the first phone number.

18. The method of claim 16, wherein the gateway device comprises a wireless communications module and wherein the dialing step comprises wirelessly sending information to the mobile telephone system.

19. The method of claim 18, wherein the wireless communications module is a CDMA or GSM module.

20. The method of claim 16, wherein the dialing step comprises sending information over a T1/E1 bus or an Ethernet LAN connection to a mobile telephone service provider.

21. The method of claim 1, wherein the transferring step comprises converting the digital payload into analog data using a digital-to-analog converter.

22. The method of claim 1, wherein the gateway device is a VoSKY Exchange device.

23. The method of claim 1, wherein the lookup table is stored in the gateway device.

24. The method of claim 1, wherein the first packet-based call is sent through a peer-to-peer Internet network.

25. The method of claim 1, wherein the gateway device can receive a plurality of packet-based calls simultaneously, the first packed-based call included in the plurality of packet-based calls.

26. The method of claim 25, wherein a second packet-based call in the plurality of packet-based calls is forwarded to a second proxy identifier in the plurality of proxy identifiers.

27. The method of claim 1, wherein the dialing step comprises dialing the first phone number using a SIP protocol.

28. The method of claim 1, wherein the gateway device comprises a LAN Ethernet connection.

29. The method of claim 28, wherein the LAN Ethernet connection uses a SIP protocol.

30. The method of claim 1, wherein the first packet-based call is generated by a computer.

31. The method of claim 1, wherein the first packet-based call is generated by a SkypeIn call.

32. The method of claim 1, wherein the first packet-based call is a Skype call, the personal identifier is a first Skype identifier, and the first proxy identifier is a second Skype identifier.

33. The method of claim 1, wherein the first packet-based call is made from a public packet-based call service.

34. A method for dialing a first phone number within a PBX system based on a packet-based call made to a personal identifier, the method comprising:
- receiving the packet-based call made to the personal identifier, the packet-based call including at least one data packet having a digital payload and a header that includes the personal identifier;
- forwarding the received packet-based call from the personal identifier and through an Internet network to a first proxy identifier within a plurality of proxy identifiers that are visible to the Internet network, wherein the plurality of proxy identifiers are associated with and direct packet-based calls to a gateway device that can communicate with the PBX system;
- analyzing, at the gateway device, the at least one data packet of the forwarded packet-based call to obtain the personal identifier based on the header;
- finding the first phone number corresponding to the obtained personal identifier using a lookup table accessible to the gateway device;
- dialing the first phone number using the gateway device;
- converting the digital payload to an analog form; and
- transferring the data packet to the first phone number.

35. The method of claim 34, wherein the first phone number is a telephone extension.

36. The method of claim 34, wherein the gateway device receives the data packet from a computer connected to the gateway device, wherein the computer is capable of receiving data packets from the Internet.

37. The method of claim 34, wherein the lookup table comprises a mapping of a plurality of personal identifiers to a plurality of phone numbers.

38. The method of claim 37, wherein the finding step comprises locating the personal identifier in the plurality of personal identifiers and obtaining the corresponding first phone number through the mapping.

39. The method of claim 37, wherein the mapping comprises a one-to-one correspondence of each personal identifier in the plurality of personal identifiers to each phone number in the plurality of phone numbers.

40. The method of claim 34, wherein the converting step is achieved using a digital-to-analog converter.

41. The method of claim 34, wherein the transferring step comprises only transferring the analog payload to the PBX system.

42. The method of claim 34, wherein the packet-based call is sent through a peer-to-peer Internet network.

43. The method of claim 34, wherein the packet-based call is a Skype call, the personal identifier is a first Skype identifier, and the first proxy identifier is a second Skype identifier.

44. A method for dialing a first phone number within an IP PBX system based on a packet-based call made to a personal identifier, the method comprising:
- receiving the packet-based call made to the personal identifier, the packet-based call including at least one data packet having a digital payload and a header that includes the personal identifier;
- forwarding the received packet-based call from the personal identifier and through an Internet network to a first proxy identifier within a plurality of proxy identifiers that are visible to the Internet network, wherein the plurality of proxy identifiers are associated with and direct packet-based calls to a gateway device that can communicate with the IP PBX system;
- analyzing, at the gateway device, the at least one data packet of the forwarded packet-based call to obtain the personal identifier based on the header;
- finding the first phone number corresponding to the obtained personal identifier using a lookup table accessible to the gateway device;
- dialing the first phone number using the gateway device; and
- transferring the data packet to the first phone number.

45. The method of claim 44, wherein the first phone number is a telephone extension.

46. The method of claim 44, wherein the gateway device receives the data packet from a computer connected to the gateway device, wherein the computer is capable of receiving data packets from the Internet.

47. The method of claim 44, wherein the lookup table comprises a mapping of a plurality of personal identifiers to a plurality of phone numbers.

48. The method of claim 47, wherein the finding step comprises locating the personal identifier in the plurality of personal identifiers and obtaining the corresponding first phone number through the mapping.

49. The method of claim 47, wherein the mapping comprises a one-to-one correspondence of each personal identifier in the plurality of personal identifiers to each phone number in the plurality of phone numbers.

50. The method of claim 44, wherein the packet-based call is sent through a peer-to-peer Internet network.

51. The method of claim 44, wherein the packet-based call is a Skype call, the personal identifier is a first Skype identifier, and the first proxy identifier is a second Skype identifier.

52. A method for dialing a first phone number within a PSTN system based on a packet-based call made to a personal identifier, the method comprising:
- receiving the packet-based call made to the personal identifier, the packet-based call including at least one data packet having a digital payload and a header that includes the personal identifier;

forwarding the received packet-based call from the personal identifier and through Internet network to a first proxy identifier within a plurality of proxy identifiers that are visible to the Internet network, wherein the plurality of proxy identifiers are associated with and direct packet-based calls to a gateway device that can communicate with the PSTN system;

analyzing, at the gateway device, the at least one data packet of the forwarded packet-based call to obtain the personal identifier based on the header;

finding the first phone number corresponding to the obtained personal identifier using a lookup table accessible to the gateway device;

dialing the first phone number using the gateway device;

converting the digital payload into analog form; and transferring the data packet to the first phone number.

53. The method of claim 52, wherein the gateway device receives the data packet from a computer connected to the gateway device, wherein the computer is capable of receiving data packets from the Internet.

54. The method of claim 52, wherein the lookup table comprises a mapping of a plurality of personal identifiers to a plurality of phone numbers.

55. The method of claim 54, wherein the finding step comprises locating the personal identifier in the plurality of personal identifiers and obtaining the corresponding first phone number through the mapping.

56. The method of claim 54, wherein the mapping comprises a one-to-one correspondence of each personal identifier in the plurality of personal identifiers to each phone number in the plurality of phone numbers.

57. The method of claim 52, wherein the dialing step comprises making a SkypeOut call to the first phone number.

58. The method of claim 52, wherein the gateway device further comprises a FXO port and the dialing step comprises sending information from the FXO port to a FXS port of the PSTN system.

59. The method of claim 52, wherein the dialing step comprises sending information over a T1/E1 bus or an Ethernet LAN connection to a telephone service provider.

60. The method of claim 52, wherein the lookup table is stored in the gateway device.

61. The method of claim 52, wherein the transferring step comprises only transferring the analog payload to the PBX system.

62. The method of claim 52, wherein the packet-based call is sent through a peer-to-peer Internet network.

63. The method of claim 52, wherein the dialing step comprises dialing the first phone number using a SIP protocol.

64. The method of claim 52, wherein the packet-based call is a Skype call, the personal identifier is a first Skype identifier, and the first proxy identifier is a second Skype identifier.

65. A method for dialing a first phone number within a mobile telephone system based on a packet-based call made to a personal identifier, the method comprising:

receiving the packet-based call made to the personal identifier, the packet-based call including at least one data packet having a digital payload and a header that includes the personal identifier;

forwarding the received packet-based call from the personal identifier and through the Internet network to a first proxy identifier within a plurality of proxy identifiers that are visible to the Internet network, wherein the plurality of proxy identifiers are associated with and direct packet-based calls to a gateway device that can communicate with the mobile telephone system;

analyzing, at the gateway device, the at least one data packet of the forwarded packet-based call to obtain the personal identifier based on the header;

finding the first phone number corresponding to the obtained personal identifier using a lookup table accessible to the gateway device;

dialing the first phone number using the gateway device; and transferring the data packet to the first phone number.

66. The method of claim 65, wherein the gateway device receives the data packet from a computer connected to the gateway device, wherein the computer is capable of receiving data packets from the Internet.

67. The method of claim 65, wherein the lookup table comprises a mapping of a plurality of personal identifiers to a plurality of phone numbers.

68. The method of claim 67, wherein the finding step comprises locating the personal identifier in the plurality of personal identifiers and obtaining the corresponding first phone number through the mapping.

69. The method of claim 67, wherein the mapping comprises a one-to-one correspondence of each personal identifier in the plurality of personal identifiers to each phone number in the plurality of phone numbers.

70. The method of claim 65, wherein the dialing step comprises making a SkypeOut call to the first phone number.

71. The method of claim 65, wherein the gateway device comprises a wireless communications module and wherein the dialing step comprises wirelessly sending information to the mobile telephone system.

72. The method of claim 71, wherein the wireless communications module is a CDMA or GSM module.

73. The method of claim 65, wherein the dialing step comprises sending information over a T1/E1 bus or an Ethernet LAN connection to a mobile telephone service provider.

74. The method of claim 65, wherein the lookup table is stored in the gateway device.

75. The method of claim 65, wherein the packet-based call is sent through a peer-to-peer Internet network.

76. The method of claim 65, wherein the dialing step comprises dialing the first phone number using a SIP protocol.

77. The method of claim 65, wherein the packet-based call is a Skype call, the personal identifier is a first Skype identifier, and the first proxy identifier is a second Skype identifier.

78. A method for dialing a first phone number within a telephone network based on a packet-based call made to a personal identifier, the method comprising:

receiving the packet-based call made to the personal identifier, the packet-based call including at least one data packet having a digital payload and a header that includes the personal identifier;

sending the at least one data packet from the packet-based call through an Internet network to a gateway device that can communicate with the telephone network, wherein the personal identifier is set to forward the data packet to the gateway device;

finding the first phone number corresponding to the personal identifier using a lookup table accessible to the gateway device;

dialing the first phone number using the gateway device; and transferring the data packet to the first phone number, wherein the gateway device has a proxy identifier and the personal identifier is set to forward calls to the proxy identifier.

79. The method of claim 78, wherein the packet-based call is sent through a peer-to-peer Internet network.

80. The method of claim 78, wherein the packet-based call is a Skype call, and the personal identifier is a Skype identifier.

81. A system that dials a first phone number within a telephone network based on a packet-based call made to a personal identifier, the system comprising:
a gateway device, the gateway device comprising:
a lookup table that maps the personal identifier to the first phone number;
a proxy identifier within a plurality of proxy identifiers that are visible to an Internet network, wherein the personal identifier is set to forward calls to the proxy identifier and wherein the plurality of proxy identifiers direct packet-based calls to the gateway device;
a plurality of input ports having a first input port capable of accessing an Internet network; and
a plurality of output ports having a first output port capable of communication with the telephone network.

82. The system of claim 81, wherein the gateway device is a VoSKY Exchange device.

83. The system of claim 81, wherein the first input port is a USB port, wireless communications module, or a data cable.

84. The system of claim 81, wherein the first input port is connected to an electronic device capable of receiving the data packet from the Internet.

85. The system of claim 84, wherein the electronic device is a computer.

86. The system of claim 81, the gateway device further comprising a digital-to-analog converter.

87. The system of claim 81, wherein the telephone system is a PBX system or an IP PBX system.

88. The system of claim 81, wherein the telephone system is a PSTN system.

89. The system of claim 88, wherein the first output port is capable of accessing the Internet.

90. The system of claim 88, wherein the first output port is a FXO port that is connected to a FXS port of the PSTN system.

91. The system of claim 88, wherein the first output port communicates directly with the PSTN system.

92. The system of claim 81, wherein the telephone system is a mobile telephone system.

93. The system of claim 92, wherein the first output port is capable of accessing the Internet.

94. The system of claim 92, wherein the first output port communicates directly with the mobile telephone network.

95. The system of claim 94, wherein the first output port wirelessly communicates with the mobile telephone network.

96. The system of claim 81, wherein the first output port is a phone port, wireless communications module, or a data cable.

97. The system of claim 81, wherein the packet-based call is a Skype call, the personal identifier is a first Skype identifier, and the proxy identifier is a second Skype identifier.

98. The method of claim 81, wherein the packet-based call is sent through a peer-to-peer Internet network.

\* \* \* \* \*